Feb. 18, 1969  W. ENGELMANN  3,427,897
CONTROL LINKAGE

Filed Oct. 13, 1966

INVENTOR
WALTER ENGELMANN

BY  *Dicke & Craig*
ATTORNEYS

United States Patent Office 3,427,897
Patented Feb. 18, 1969

3,427,897
CONTROL LINKAGE
Walter Engelmann, Eislingen (Fils), Germany, assignor to Fibora AG, Zurich, Switzerland
Filed Oct. 13, 1966, Ser. No. 586,529
U.S. Cl. 74—588    27 Claims
Int. Cl. G05g *1/00, 3/00;* F16b *17/00*

ABSTRACT OF THE DISCLOSURE

A control linkage with an angle connection made of spring steel band, especially of the type adapted for pull operation, having laterally angular pins riveted thereto or screwed thereon and a sheet metal securing safety device.

---

Control linkages with angle connection have been primarily utilized in the automotive industry and also in the construction and manufacture of various apparatus.

In automotive engineering these control linkages are used in large quantities, e.g., for carburetor control. Because of the simplification and lower costs involved the automobile firms tend more and more to adopt control linkages for use in control systems. Up to now, angularly bent round stock rods have been employed for these systems. Apart from the fact that accurate bending is difficult to accomplish, it is necessary to provide the bent ends with locking-pin holes, annular grooves or notches in order to maintain the lever in position. In addition thereto, clamp carriers have been used which are slipped over the levers and are attached to the round stock rod by holders. Where the control levers are not exactly aligned with each other, the levers will in most cases not extend in an axial direction, which makes it necessary to resort to deflections which cannot be readily performed in round stock rods. Where the particular construction of the system requires a longitudinal adjustment of the linkage, angularly bent round stock rods are not eligible or usable inasmuch as the arrangement of an adjusting device is very difficult and accordingly expensive for the intended purpose. In such cases it has been customary to prefer the relatively still expensive spherical joints. It is of the utmost importance that such control linkages be cheap in manufacture and, because of the accessibility, be easy to mount and dismount, possibly even without the use of tools. Moreover, the linkage should be adjustable longitudinally and afford the necessary safety even after a long period of service.

The object of the present invention is to provide a control linkage with an angle connection of the type referred to above which eliminates the aforementioned shortcomings of the prior art and which meets the above requirements made of such control linkages with angle connections.

To achieve this object the control linkage according to the present invention is made of spring steel band material which, prior to hardening, can be easily bent and twisted in any direction, whereby in combination therewith, a stud with or without a collar is angularly riveted or threadably secured thereto, on the one hand, in a punched hole and on the other, in an oblong hole. There are no locking-pin holes or annular grooves or notches provided in the stud. Upon insertion of the stud into the lever connection hole on one side, a simple, hairpin shaped sheet metal securing means is urged over the smooth protruding end of the stud. This hairpin shaped securing means is constructed according to the present invention in such a manner that the two through bores register in the mutually parallel position of the legs and permit a pushing over without resistance. The hole in the resilient front leg has a diameter which is slightly greater than the hole in the horizontal rear abutting leg. Owing to the predetermined resiliency, the front leg is urged rearwardly into its prearranged sloping position which causes the leg, in conjunction with the slightly greater hole, to be tightly jammed onto the stud end. The securing means can be readily removed only after the front leg has been brought into a position parallel to the rear leg by lifting the same. Where a stud is provided without collar, the securing means or spring will be constructed in the shape of an S, which imparts to the lever an unobjectionable guidance. In order to prevent the S-shaped securing means from turning on the stud, the rear guide leg may, for example, be angularly bent and may be provided with a nose engaging in a hole provided therefor in the control linkage made from spring steel band. However, the S-shaped securing means may also be used in control linkages with an angle connection made from round stock rods, whereby the bent portion of the guide leg is then provided with a recess or aperture corresponding to the diameter of the round stock.

Where a longitudinal adjustment of the control linkage is required, an oblong hole or aperture will preferably be provided in the second face of the spring band and the end also provided with an elongated aperture or hole will also be bent in such a hairpin shaped manner that the two oblong holes or apertures will exactly register with each other. The stud provided with the collar is inserted and fitted into the rear oblong hole of the control linkage and is threadably secured tightly after the longitudinal adjustment by means of a hexagonal nut. The end bent in the manner of a hairpin is biased or prestressed so that, upon insertion of the lever, it will spring over or abut closely against the lever, and assure against an unwanted release of the connection. The same arrangement is also provided for the nonadjustable face, which, however, has round holes instead of the oblong ones.

Thus, in this manner the present invention provides by the simplest means a control linkage with an angle connection which meets all requirements that can be made of such lever systems.

According to a further feature of the present invention representing a further improvement, the pin is constructed in the form of a cone and supported in a hollow cone-shaped bore of the linkage lever so as to be free from any play. Moreover, the control linkage may be connected to a further linkage element along the longitudinal axis so as to be longitudinally adjustable.

In this manner, it is possible not only to mount a control linkage free from play without resorting to special ways and means but also to make possible an accurate longitudinal adjustment of the control linkage. The feature of freedom from play in continuously maintained because the sheet metal securing safety device urges the pin into the hollow cone-shaped mounting in an elastically resilient manner. The longitudinal adjustability is also of special importance in order to be able to effect the assembly and transmission by rods in the simplest and completely unobjectionable manner and in order to permit an adjustment, if necessary, at any time.

The longitudinal adjustment is accomplished, for example, by means of a connecting linkage and a threaded nut with either the control linkage or the additional linkage element including an oblong hole or elongated aperture. The connecting linkage may also be omitted where either the control linkage or the additional element are provided with an oblong hole.

Accordingly, it is an object of the present invention to provide control linkages with an angle connection which eliminates, by extremely simple means, the aforementioned shortcomings encountered in the prior art constructions.

It is another object of the present invention to provide control linkages with angle connections of the type described above which can be readily manufactured in an inexpensive manner and can be easily installed and disassembled.

A further object of the present invention resides in a control linkage of the types described above which assures a long life, utilizes relatively inexpensive materials that can be easily handled and assures a secure assembly of the parts notwithstanding the ease of disassembly.

Still another object of the present invention resides in control linkages of the type described which assures complete freedom from play without special means.

These and other objects, features, and advantages of the present invention will become more obvious from the following description when taken in connection with the accompanying drawing which shows, for purposes of illustration only, several embodiments in accordance with the present invention, and wherein.

Figure 1:
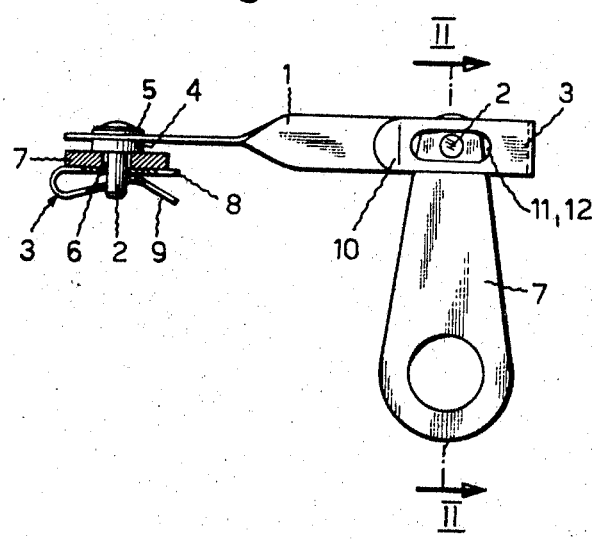
FIGURE 1 is a front elevational view of one embodiment, partly in cross section, of a control linkage in accordance with the present invention provided with an angle connection and with a sheet metal securing safety device having a rigid face and an adjustable face.

Referring now to the drawing, wherein like reference numerals are used throughout the various views to designate like parts, in the control linkage provided with an angle connection and with a securing safety device as illustrated, the control linkage made of spring steel band is designated by reference numeral 1, the angularly fitted stud by reference numeral 2, and the snap wire spring by reference numeral 3.

Figure 2:
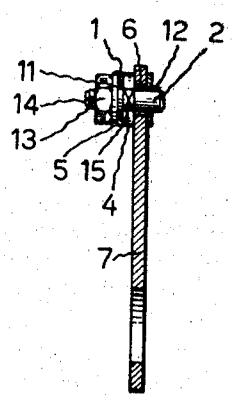
FIGURE 2 is a cross sectional view taken along line II—II of FIGURE 1.

In the embodiment according to FIGURES 1 and 2, a riveted stud 2 with a collar 4 and with a disc 5, is provided on one side. Upon insertion of the stud 2, in conjunction with the control linkage 1, into the lever aperture 6 of lever 7, the latter comes to rest against the collar 4. The securing means generally designated by reference numeral 3 is fitted over the free end of the stud 2 with the legs 8 and 9 of the securing spring extending generally parallel to one another so that the rear leg 8 abuts resiliently against lever 7. The front leg 9 tends to spring back from its predetermined inclined position and is securely and immovably clamped in position on the stud 2 owing to the slightly greater hole diameter.

The other side of the control linkage 1 is provided in the extension of the spring band with a pin-shaped resilient strip or clip 10. Oblong holes 11 and 12 are provided in the control linkage 1 and in the resilient strip 10, respectively. The stud 2 is inserted into the oblong hole 11 of the control linkage 1, which stud 2 is provided in this embodiment with a threaded pin 13, and which, upon longitudinal adjustment of the two studs 2 to each other, is threadably secured tightly by means of a hexagonal nut 14 below which is conveniently arranged a disc 5. To this end, flat faces 15 or the like are provided on the collar 4 of the stud 2. The resilient strip 10 has a forwardly effective bias or prestress so that said strip 10 is lifted as the stud 2 is inserted into the lever opening 6. After positioning over the lever 7, the resilient strip 10 snap-fits back into its previous position and abuts resiliently against the lever 7, whereby the latter is immovably connected with the control linkage 1, yet permits rotation thereof.

Figure 3:
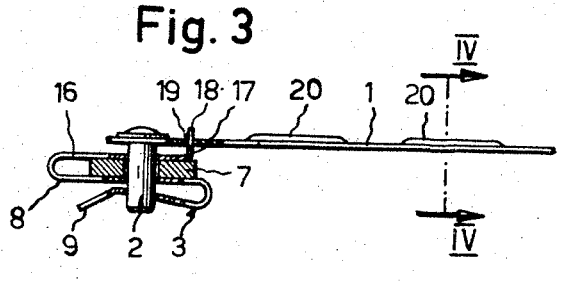
FIGURE 3 is a plan view, partly in cross section, of another embodiment of a control linkage with an angle connection and with a securing safety device in accordance with the present invention.
Figure 4:
FIGURE 4 is a cross sectional view taken along line IV—IV of FIGURE 3.

In the embodiment according to FIGURES 3 and 4, the stud 2 is constructed without collar 4. In order to hold the lever 7 in its predetermined position with respect to the control linkage 1, the securing spring 3 is shaped in the form of an S and is provided with another guide leg 16 which includes at the end thereof a deflection 17 provided, for instance, with a nose 18. The deflection 17 serves to maintain the desired spacing, whereas the nose 18 or the like engages in a hole 19 of the control linkage 1 to avoid twisting of the snap wire 2 as the lever performs a swinging movement with regard to the control linkage 1.

Figure 5:
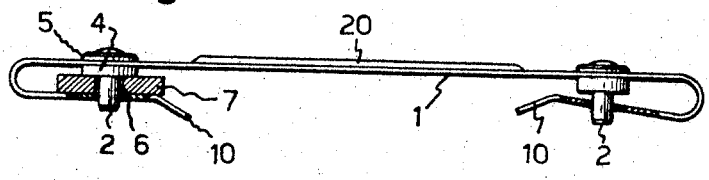
FIGURE 5 is a plan view, partly in cross section, of a further embodiment of a control linkage in accordance with the present invention having a securing safety device with fixed studs on both sides thereof.

FIGURE 5 shows an embodiment of a control linkage 1 having two fixedly riveted studs 2 and without any longitudinal adjustment. If the control linkage 1 with an angle connection is intended to transmit traction and compressive forces, provision will be made, in a manner known per se, for reinforcing fins 20, turned over edges, or the like.

The scope of the present invention still allows for other modifications of the illustrated embodiments. For instance, the studs 2 could be arranged for longitudinal adjustment on both sides of the control linkage 1 and could be provided with additionally threadably secured or riveted resilient strips 10.

The embodiments shown in the drawing, however, are particularly advantageous and each of them has its peculiar advantages, such as greater ease in manufacture, economic cutouts or stampings, fewer component parts, and reliability in mounting and dismounting without the use of tools.

Figure 6:
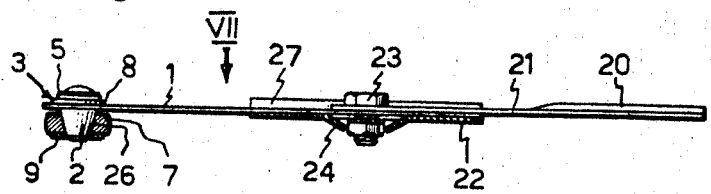
FIGURE 6 is a plan view, partly in cross section, of still another embodiment of a control linkage in accordance with the present invention, wth cone-shaped studs.
Figure 7:
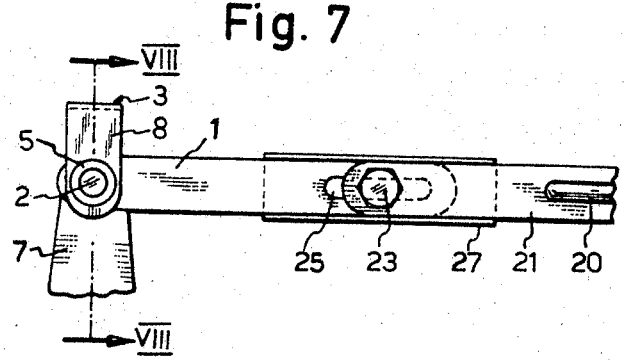
FIGURE 7 is a side-elevational view taken in the direction of arrow VII of FIGURE 6.
Figure 8:
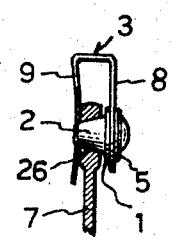
FIGURE 8 is a partial cross sectional view taken along line VIII—VIII of FIGURE 7.

In the embodiment as shown in FIGURES 6–8 the control linkage 1 is pivotably connected to a linkage lever 7 of any shape by means of a securing means 3 having legs 8 and 9, by means of the interposed disk 5 and of pin 2.

In contrast to the embodiment described above, the pin 2 of this embodiment is constructed in the form of a cone. Moreover, the pin 2 is positioned in a hollow cone-shaped bore 26 provided in the linkage lever 7. The elastically resilient securing safety device 3 keeps the pin 2 continuously pressed in position in the bore 26 such that the mounting is free from any play and is thus maintained without affecting the swiveling or pivoting ability between the control linkage 1 and the linkage lever 7. Incidentally, the securing safety device 3 may be constructed and arranged in different manner as already described and illustrated in connection with the other embodiments described herein.

In many cases, it is also advantageous to be able to exactly determine or adjust the length of the control linkage 1. To this end, the control linkage is provided with a special linkage part 21 which is also made from spring steel band and may have reinforcing fins 20 for cross-strengthening. The free end of the control linkage 1 and one of the free ends of the linkage part 21 are superposed one upon the other and are held by a special connecting link 22. The other end of the linkage part 21 (not shown) is connected to a further linkage lever or the like in any suitable manner, for example, as described above.

The connecting link 22 is provided with deflected or bent longitudinal edges 27 embracing the ends of the rods 1 and 21 so that the latter are guided therein and permit longitudinal adjustment. In this embodiment a screw nut 23 is inserted into the free end of the linkage part 21, which screw nut 23 penetrates the connecting link 22 through a bore which may be provided with obliquely projecting noses 24 abutting against the screw nut 23. This prevents the screw nut 23 from twisting as it is tightened. Moreover, in this embodiment the control linkage 1 is provided at its free end with an oblong hole 25, which permits to determine accurately the particular adjustment of rods 1 and 21 by means of the screw nut 23. This makes it possible by simple means to exactly position or adjust in its length the control linkage according to the particular conditions at any time.

Figure 9:
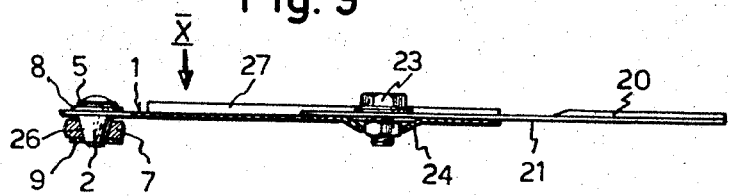
FIGURE 9 is a plan view, partly in cross section, of a still further embodiment of a control linkage provided with conically shaped studs in accordance with the present invention.
Figure 10:
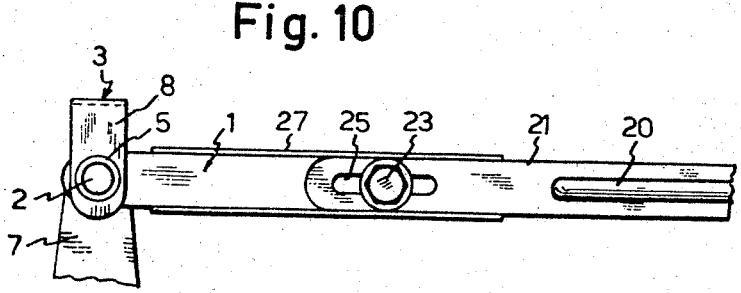
FIGURE 10 is a partial side-elevational view taken in the direction of arrow X of FIGURE 9.

In the embodiment shown in FIGURES 9 and 10 the longitudinal adjustment is simplified in that, for example, the free end of the control linkage 1 is provided with bent over longitudinal edges 27 between which is positioned the end of the linkage part 21 to permit longitudinal adjustment. The remainder of construction, including fixation of the adjusted position by means of a screw nut 23, is the same as in the embodiment shown in FIGURES 5 and 7. Of course, it is easily feasible to interchange the control linkage 1 and the linkage component 21 with respect to the provision of the oblong hole and the arrangement of the screw nut 23.

While I have shown and described several embodiments in accordance with the present invention, it is understood that the same is not limited thereto, but is susceptible of numerous changes and modifications as known to a person skilled in the art, and I therefore do not wish to be limited to the details shown and described herein, but intend to cover all such changes and modifications as are encompassed by the scope of the appended claims.

I claim:

1. A control linkage with an angle connection, comprising control linkage means made from spring steel band, stud means having an axis and being angularly secured in said control linkage means, lever means movably mounted on said stud means, and securing means operatively engaging said stud means for maintaining the assembly of said control linkage means with said lever means and for resiliently axially biasing said lever means toward said control linkage means.

2. A control linkage according to claim 1, wherein at least one of said securing means, which is constituted by a portion of said spring steel band with the end thereof bent into a hairpin shaped configuration, is formed into resilient shackle-type strip means.

3. A control linkage according to claim 1, wherein both said securing means, which are each constituted by a portion of said spring steel band with the ends thereof bent into a hairpin shaped configuration, is formed into resilient shackle-type strip means.

4. A control linkage according to claim 1, further comprising a resilient-hairpin shaped strip means secured as separate part together with said stud means on said control linkage means.

5. A control linkage according to claim 1, wherein said securing means includes a leaf spring means bent into a hairpin-like shape and having a rearwardly disposed leg portion located substantially perpendicularly to the stud axis and a forwardly disposed leg portion resiliently effective obliquely with respect to the stud axis, the forwardly disposed leg portion being provided with a stud aperture which has a diameter slightly larger than the diameter of the stud means and the forwardly disposed leg portion being fixedly retained in its inclined position on said stud means.

6. A control linkage according to claim 1, wherein the securing means is of essentially S-shape and is provided with a further guide leg portion and at the latter with an angularly bent portion having a nose, said nose engaging into an aperture provided in said control linkage means to prevent relative rotation.

7. A control linkage according to claim 2, wherein elongated apertures are provided in said control linkage means and in the hairpin-shaped resilient strip means for the longitudinal adjustment of the stud means.

8. A control linkage according to claim 4, wherein elongated apertures are provided in said control linkage means and in the hairpin-shaped resilient strip means for the longitudinal adjustment of the stud means.

9. A control linkage according to claim 5, wherein elongated apertures are provided in said control linkage means and in the hairpin-shaped means for the longitudinal adjustment of the stud means.

10. A control linkage according to claim 1, wherein said control linkage means is provided with at least one reinforcing means for stiffening the same to enable transmission of compressive forces.

11. A control linkage according to claim 10, wherein said reinforcing means includes a plurality of reinforcing fins.

12. A control linkage according to claim 10, wherein said reinforcing means includes turned-over edge portions.

13. A control linkage according to claim 2, wherein said control linkage means is provided with at least one reinforcing means for stiffening the same to enable transmission of compressive forces.

14. A control linkage according to claim 13, wherein said reinforcing means includes a plurality of reinforcing fins.

15. A control linkage according to claim 13, wherein said reinforcing means includes turned-over edge portions.

16. A control linkage according to claim 1, wherein the stud means is of conical construction and is supported substantially without play in a hollow conical bore of the lever means.

17. A control linkage according to claim 16, further comprising another linkage part connected with said control linkage means along the longitudinal axis and adjustable in its length.

18. A control linkage according to claim 17, further comprising substantially flat connecting link means having substantially longitudinally bent edge portions, the free end of said control linkage means and the other free end of said linkage part being disposed in superimposed relationship within the flat connecting link means, threaded nut means provided at the free end of said control linkage means and extending through the connecting link means, and the other free end of said linkage part being provided with an elongated aperture through which extends the threaded nut means.

19. A control linkage according to claim 18, wherein said connecting link means is provided with outwardly bent nose portions abutting against the nut means.

20. A control linkage according to claim 17, wherein the free end of said control linkage means is provided on both sides with angularly bent longitudinal rim portions, the free end of the linkage part being longitudinally displaceably arranged between said rim portions.

21. A control linkage according to claim 4, wherein the stud means is of conical construction and is supported substantially without play in a hollow conical bore of the lever means.

22. A control linkage according to claim 21, further comprising another linkage part connected with said control linkage means along the longitudinal axis and adjustable in its length.

23. A control linkage according to claim 5, wherein the stud means is of conical construction and is supported substantially without play in a hollow conical bore of the lever means.

24. A control linkage according to claim 23, further comprising another linkage part connected with said control linkage means along the longitudinal axis and adjustable in its length.

25. A control linkage according to claim 24, further comprising substantially flat connecting link means having substantially longitudinally bent edge portions, the free end of said control linkage means and the other free end of said linkage part being disposed in superimposed relationship within the flat connecting link means, threaded nut means provided at the free end of said control linkage means and extending through the connecting link means, and the other free end of said linkage part being provided with an elongated aperture through which extends the threaded nut means.

26. A control linkage according to claim 25, wherein said connecting link means is provided with outwardly bent nose portions abutting against the nut means.

27. A control linkage according to claim 24, wherein the free end of said control linkage means is provided on both sides with angularly bent longitudinal rim portions, the free end of the linkage part being longitudinally displaceably arranged between said rim portions.

References Cited

UNITED STATES PATENTS

| | | | |
|---|---|---|---|
| 1,619,589 | 3/1927 | Steenrod | 85—36 |
| 2,295,685 | 9/1942 | Place | 85—36 |
| 2,338,754 | 1/1944 | Bonas. | |

FOREIGN PATENTS 713,447  8/1954  Great Britain.

FRED C. MATTERN, JR., *Primary Examiner.*

F. D. SHOEMAKER, *Assistant Examiner.*

U.S. Cl. X.R.

85—36

UNITED STATES PATENT OFFICE
CERTIFICATE OF CORRECTION

Patent No. 3,427,897

February 18, 1969

Walter Engelmann

It is certified that error appears in the above identified patent and that said Letters Patent are hereby corrected as shown below:

In the heading to the printed specification, between lines 6 and 7, insert -- Claims priority, applications Germany, Oct. 13, 1965, E 30,261; June 28, 1966, E 31,936 --.

Signed and sealed this 24th day of March 1970.

(SEAL)
Attest:

Edward M. Fletcher, Jr.
Attesting Officer

WILLIAM E. SCHUYLER, JR.
Commissioner of Patents